(12) United States Patent
Tsukada

(10) Patent No.: US 11,251,431 B2
(45) Date of Patent: Feb. 15, 2022

(54) ALL-SOLID-STATE BATTERY

(71) Applicant: TDK CORPORATION, Tokyo (JP)

(72) Inventor: Takeo Tsukada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 216 days.

(21) Appl. No.: 16/498,884

(22) PCT Filed: Mar. 28, 2018

(86) PCT No.: PCT/JP2018/012971
§ 371 (c)(1),
(2) Date: Sep. 27, 2019

(87) PCT Pub. No.: WO2018/181576
PCT Pub. Date: Oct. 4, 2018

(65) Prior Publication Data
US 2020/0266445 A1     Aug. 20, 2020

(30) Foreign Application Priority Data
Mar. 30, 2017  (JP) .............................. JP2017-067403

(51) Int. Cl.
*H01M 4/58* (2010.01)
*H01M 10/0525* (2010.01)
*H01M 4/136* (2010.01)
*H01M 10/0562* (2010.01)
(Continued)

(52) U.S. Cl.
CPC ......... *H01M 4/5825* (2013.01); *H01M 4/131* (2013.01); *H01M 4/136* (2013.01); *H01M 10/0525* (2013.01); *H01M 10/0562* (2013.01); *H01M 2004/021* (2013.01); *H01M 2004/027* (2013.01); *H01M 2004/028* (2013.01); *H01M 2300/0065* (2013.01)

(58) Field of Classification Search
None
See application file for complete search history.

(56) References Cited

U.S. PATENT DOCUMENTS

| 2007/0202414 A1 | 8/2007 | Yoshida et al. |
| 2011/0133118 A1* | 6/2011 | Honma ............... C03C 10/00 252/182.1 |
| 2016/0268629 A1 | 9/2016 | Tanaka et al. |

FOREIGN PATENT DOCUMENTS

JP     2007-258165 A     10/2007

OTHER PUBLICATIONS

Jul. 17, 2018 Written Opinion of the International Searching Authority issued in International Patent Application No. PCT/JP2018/012971.

(Continued)

*Primary Examiner* — Eugenia Wang
(74) *Attorney, Agent, or Firm* — Oliff PLC

(57) ABSTRACT

A high discharge capacity in an all-solid-state battery in which lithium vanadium phosphate is used in a positive electrode active material layer and a negative electrode active material layer. An all-solid-state battery wherein a positive electrode active material layer and a negative electrode active material layer contain lithium vanadium phosphate, which includes a Li- and V-containing polyphosphate compound and satisfies $1.50 < Li/V \leq 2.30$, with the percentage of divalent V included in the V being 5~80%. Thus, a high discharge capacity can be provided.

6 Claims, 1 Drawing Sheet

(51) Int. Cl.
*H01M 4/131* (2010.01)
*H01M 4/02* (2006.01)

(56) References Cited

OTHER PUBLICATIONS

Jul. 17, 2018 International Search Report issued in International Patent Application No. PCT/JP2018/012971.

* cited by examiner

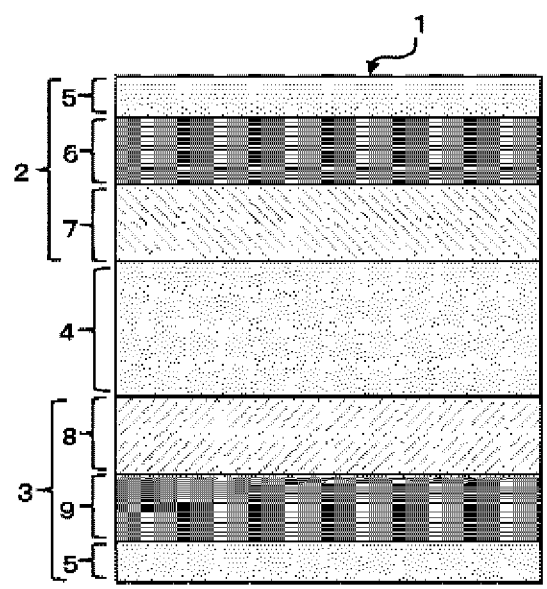

ALL-SOLID-STATE BATTERY

The present invention relates to an all-solid-state battery with advantages of high discharge capacity, high safety and low cost.

BACKGROUND

In recent years, with the development of portable machines such as personal computers and portable phones, the demand for batteries as power supplies has greatly expanded. In batteries used for such purposes, as a medium for the movement of ions, liquid electrolyte (electrolytic liquid) such as organic solvents was used in the past. Problems such as the leakage of electrolytic liquid may occur in use of batteries with such electrolytic liquid.

In order to eliminate this problem, the development of all-solid-state batteries, which use solid electrolyte instead of liquid electrolyte and consist of solids as all of the other elements, is under way. Because the electrolyte of the all-solid-state batteries is solid, there are no worries such as liquid leakage and liquid exhaustion in the all-solid-state batteries. In addition, it is not easy to produce problems such as deterioration of battery performance caused by corrosion. All-solid-state batteries, as secondary batteries which can easily obtain high charge-discharge capacity and energy density, are being actively studied in various aspects.

However, up to now, all-solid-state batteries using solid electrolyte as electrolyte still have the problem of smaller discharge capacity compared with batteries using liquid electrolyte. Although it has been disclosed to use $Li_3V_2(PO_4)_3$ of a polyphosphate electrode active material with multiple redox potentials (3.8V, 1.8V) for positive electrodes and negative electrodes to fabricate symmetrical-electrode batteries in order to improve the charge-discharge cycle characteristics, the improvement of discharge capacity has not been disclosed (in patent document 1). Furthermore, under the situation that stoichiometric $Li_3V_2(PO_4)_3$ is used as an active material of a sintered body for positive electrodes or negative electrodes, the components of the crystalline grain boundaries formed during sintering becomes uneven and the lithium ion conduction is hindered. Therefore, there is a technical problem that high discharge capacity cannot be obtained.

Therefore, even for all-solid-state batteries disclosed in patent document 1, there is still room for improvement with regard to discharge capacity.

PATENT DOCUMENTS

Patent Document 1: JP 2007-258165

SUMMARY

The present invention is accomplished in view of the problems in the prior art, and the purpose is to provide an all-solid-state battery with high discharge capacity.

In order to accomplish the above technical problems, the inventors have made a thorough study. The results show that the positive electrode active material layer and the negative electrode active material layer contain lithium vanadium phosphate, the lithium vanadium phosphate contains a polyphosphate compound containing Li and V, and the ratio of the contained Li to V and the proportion of bivalent V contained in V are due to capacity, so that the present invention is accomplished.

In other words, the present invention provides an all-solid-state battery as follow.

The all-solid-state battery provided by the present invention is an all-solid-state battery which is provided with a solid electrolyte layer between a pair of electrodes, characterized in that a positive electrode active material layer and an negative electrode active material layer forming the pair of electrodes contain lithium vanadium phosphate, the lithium vanadium phosphate contains a polyphosphate compound containing Li and V, and satisfies $1.50 < Li/V \leq 2.30$, and the proportion of bivalent V contained in V is 5%~80%.

By using the positive electrode active material layer and the negative electrode active material layer according to the composition, the lithium ions in the lithium vanadium phosphate can stably exist in crystal lattices, and the excessive diffusion of Li during sintering can be controlled such that a uniform grain boundary can be formed, and the reduction of lithium ion conduction between grains can be inhibited. As a result, a large number of lithium ions can be exported and imported, so high capacity can be achieved.

The all-solid-state battery provided by the present invention is characterized in that the solid electrolyte layer contains lithium aluminum titanium phosphate.

According to the composition, the movement of lithium ions in the positive electrode active material layer and the negative electrode active material layer becomes easier. At the same time, the movement of lithium ions in the solid electrolyte layer between the positive electrode active material layer and the negative electrode active material layer becomes easier. Therefore, further high capacity can be realized.

The all-solid-state battery provided by the present invention is characterized in that the value of Li/V of the lithium vanadium phosphate contained in the positive electrode active material layer is greater than the value of Li/V of the lithium vanadium phosphate contained in the negative electrode active material layer.

According to the composition, the positive electrode active material layer contains more Li than the negative electrode active material layer, thus more Li moves from the positive electrode active material layer to the negative electrode active material layer, and more Li can be received in the negative electrode active material layer. Therefore, further high capacity can be realized.

The all-solid-state battery provided by the present invention is characterized in that the positive electrode active material layer satisfies $1.60 \leq Li/V \leq 2.30$ and the proportion of bivalent V in V is 10%~80%; and the negative electrode active material layer satisfies $1.50 < Li/V \leq 2.10$, and the proportion of bivalent V in V is 5%~57%.

By using the positive electrode active material layer and the negative electrode active material layer with the composition, the positive electrode active material layer contains more Li than the negative electrode active material layer, thus more Li moves from the positive electrode active material layer to the negative electrode active material layer, and more Li can be received in the negative electrode active material layer. In addition, by making the positive electrode active material layer contain more bivalent V than the negative electrode active material layer, lithium ions can be made to be more stable in the crystal lattices. By forming uniform grain boundaries, the reduction of lithium ion conduction between grains can be inhibited, and thus further high capacity can be realized.

The all-solid-state battery provided by the present invention is characterized in that the solid electrolyte contains $Li_fAl_gTi_hP_iO_j$ (wherein, f, g, h, i and j are respectively values satisfying 0.5≤f≤3.0; 0.0≤g≤1.0; 1.0≤h≤2.0; 2.8≤i≤3.2; and 9.25<j≤5.0).

According to the composition, by using $Li_fAl_gTi_hP_iO_j$ (wherein, f, g, h, i and j are respectively values satisfying 0.5≤f≤3.0; 0.0<g≤1.0; 1.0≤h≤2.0; 2.8≤i≤3.2; and 9.25<j≤15.0) with high lithium ion conductivity as lithium aluminum titanium phosphate of the solid electrolyte layer, further high capacity can be realized.

The all-solid-state battery provided by the present invention is characterized in that the relative density of the pair of electrode layers and the solid electrolyte layer arranged between the pair of electrode layers is 80% or above.

According to the present invention, the all-solid-state battery with high discharge capacity can be provided.

BRIEF DESCRIPTION OF THE DRAWINGS

FIG. 1 is a diagram illustrating an all-solid-state battery according to the embodiment.

DETAILED DESCRIPTION OF EMBODIMENTS

The preferred examples of the present invention will be described below in detail with reference to the drawings. It needs to be stated that the same or equivalent parts in the drawings are marked with the same reference signs, and the description of the repeated parts are omitted. In addition, the size scale of the drawings is not limited to the illustrated scale.

All-Solid-State Battery

The FIGURE is a diagram illustrating the conceptual structure of an all-solid-state battery 1 according to the present embodiment. As illustrated in the FIGURE, a positive electrode layer 2 and an negative electrode layer 3 of the all-solid-state battery 1 according to the embodiment are laminated with a solid electrolyte layer 4 between them, the positive electrode layer 2 consists of a packaging layer 5, a positive electrode current collector layer 6, and a positive electrode active material layer 7; and the negative electrode layer 3 consists of an negative electrode active material layer 7, an negative electrode current collector layer 8, and a packaging layer 5.

The all-solid-state battery according to the present embodiment is an all-solid-state battery provided with a solid electrolyte layer between a pair of electrode layers, wherein a positive electrode active material layer and an negative electrode active material layer forming the pair of electrode layers contain lithium vanadium phosphate, the lithium vanadium phosphate contains a polyphosphate compound containing Li and V, and satisfies 1.50<Li/V≤2.30, and the proportion of bivalent V contained in the V is preferably 5%-80%.

According to the composition, by using the positive electrode active material layer or the negative electrode active material layer, the lithium ions in the lithium vanadium phosphate can stably exist in crystal lattices, and the excessive diffusion of Li during sintering can be controlled so that a uniform grain boundary can be formed, and the reduction of lithium ion conduction between grains can be inhibited. As a result, a large number of lithium ions can be exported and imported, so high capacity can be achieved.

It needs to be stated that, for the lithium vanadium phosphate in the present embodiment, the material is quantitatively analyzed by adopting high-frequency inductively coupled plasma emission spectroscopy (ICP), and Li/V is calculated. In addition, the valence of V in the lithium vanadium phosphate can be obtained by using X-ray photoelectron spectroscopy (XPS) from chemical shift.

In addition, in the all-solid-state battery according to the present embodiment, the solid electrolyte layer preferably contains lithium aluminum titanium phosphate.

According to the composition, when a solid electrolyte containing lithium aluminum titanium phosphate is used in the solid electrolyte layer, for the purpose of a high ion conductivity of the solid electrolyte, even the movement of lithium ions between the positive electrode and negative electrode layers becomes easier, so higher capacity can be realized. Furthermore, the solid electrolyte containing the active material lithium vanadium phosphate and lithium aluminum titanium phosphate according to the present embodiment is homogeneous polyphosphate ceramic, therefore, it is not easy to form uneven grain boundaries at these interfaces which can hinder the movement of lithium ions, and thus the charge-discharge capacity can be improved.

In addition, in the all-solid-state battery according to the present embodiment, the value of Li/V in the positive electrode active material layer is greater than the value of Li/V in the negative electrode active material layer.

According to the composition, the positive electrode active material layer contains more Li than the negative electrode active material layer, thus more Li moves from the positive electrode active material layer to the negative electrode active material layer, and more Li can be received in the negative electrode active material layer. Therefore, further high capacity can be realized.

In the all-solid-state battery according to the present embodiment, it is further preferable that Li/V of the lithium vanadium phosphate in the positive electrode active material layer satisfies 1.6≤Li/V≤2.3, and the proportion of bivalent V contained in V is 10%~80%; and Li/V of the lithium vanadium phosphate in the negative electrode active material layer satisfies 1.5<Li/V≤2.1, and the proportion of bivalent V contained in V is 5%~57%.

According to the composition, by using the positive electrode active material layer and the negative electrode active material layer, the positive electrode active material layer contains more Li than the negative electrode active material, thus more Li moves from the positive electrode active material layer to the negative electrode active material layer, and more Li can be received in the negative electrode active material layer. In addition, by making the positive electrode active material layer contain more bivalent V than the negative electrode active material layer, lithium ions can be made to be more stable in the crystal lattices. By forming uniform grain boundaries, the reduction of lithium ion conduction between grains can be inhibited, and thus further high capacity can be realized.

In addition, although the reason is not clear, it is considered that, by respectively changing Li/V of lithium vanadium phosphate and the proportion of bivalent V in V in the positive electrode active material layer and the negative electrode active material layer, the crystalline grain boundaries formed during sintering form a composition structure that can be easily used for the working of the positive electrode and a composition structure that it is suitable for the working of the negative electrode.

In the all-solid-state battery provided by the present invention, as the lithium aluminum titanium phosphate, $Li_fAl_gTi_hP_iO_j$ with high lithium ion conductivity is preferably used ((wherein f, g, h, i and j are respectively values satisfying 0.5≤f≤3.0, 0.0<g≤1.0, 1.0≤h≤2.0, 2.85≤i≤53.20 and 9.25<j≤15.0).

According to the composition, by using $Li_fAl_gTi_hP_iO_j$ with high lithium ion conductivity as the lithium aluminum titanium phosphate ((where f, g, h, i and j are respectively values satisfying $0.5 \leq f \leq 3.0$, $0.0 < g \leq 1.0$, $1.0 \leq h \leq 2.0$, $2.8 \leq i \leq 3.2$ and $9.25 < j \leq 15.0$), higher charge-discharge characteristics can be obtained.

Method for Preparing the Ceramic Material

The lithium vanadium phosphate material in the present embodiment may be obtained through heat treatment of the mixed raw material, which is a mixture of a Li compound, a V compound and a phosphate compound or a Li phosphate compound. In addition, the Lithium aluminum titanium phosphate material may be obtained through heat treatment of the mixed material, which is a mixture of a Li compound, and an Al compound, a Ti compound, a phosphate compound or a Ti phosphate compound.

As the Li compound, LiOH or its hydrate, $Li_2CO_3$, $LiNO_3$, $CH_3COOLi$ and the like can be listed. As the V compound, $V_2O_3$, $V_2O_5$ and the like can be listed. As the phosphate compound, $H_3PO_4$, $NH_4H_2PO_4$ and $(NH_4)_2HPO_4$ can be listed. In addition, as the Li phosphate compound, $LiPO_3$, $Li_4P_2O_7$, $Li_5P_3O_{10}$, $Li_6P_4O_{14}$ and the like can be listed.

In addition, as the Al compound, $Al_2O_3$, $Al(OH)_3$, $Al_2(SO_4)_3$ and the like can be listed. As the Ti compound, $TiO_2$, $Ti_2O_3$, $TiCl_4$, $Ti(OR)_4$ and the like can be listed. As the Ti phosphate compound, $TiP_2O_7$, $Ti_3P_4O_{16}$ and the like can be listed.

An example of the method for preparing lithium vanadium phosphate according to the present embodiment will be described. The method for preparing the oxide comprises performing the following process in turn, that is, (a) a raw material mixing process, then (b) a heat treatment process, and at last (c) a crushing process. These processes will be sequentially described below.

(a) Raw Material Mixing Process

In the raw material mixing process, in lithium vanadium phosphate, starting materials are respectively weighed and mixed in the way that the ratio of Li to V is $1.5 < Li/V \leq 2.30$. As the starting materials, carbonate or sulfate, nitrate, oxalate, chloride, hydroxide, oxide, phosphate and the like of various elements may be used. Herein, it is preferable that the raw materials or oxides that have been obtained as lithium phosphate do not produce unnecessary gases during the heat treatment, and carbonate that produces carbon dioxide or hydroxide that produces water vapor by thermal decomposition is further preferred. With respect to the mixing method, dry mixing and crushing without solvent or wet mixing and crushing in solvent may be adopted. However, considering the improvement of mixing performance, wet mixing and crushing in solvent are preferred. A mixing method may use, for example, a planetary mixer, an attritor, or a ball mill. As the solvent, substances which can not dissolve Li are preferred. For example, organic solvents such as ethanol are preferred. The mixing time depends on the amount to be mixed. For example, it may be set to be 1 h to 32 h. In addition, in lithium aluminum titanium phosphate, the starting materials are respectively weighed to obtain the desired composition and then are mixed by adopting any one of the methods.

(b) Calcination Process

In the calcination process, in lithium vanadium phosphate, the mixed powder obtained in the mixing process is calcined. At this moment, the calcination temperature is preferably higher than temperature which causes the change of the state of the starting materials (for example, phase change). For example, when $Li_2CO_3$ is used as one of the starting materials, the temperature is preferably to be the temperature at which the carbonate is decomposed to generate the desired lithium vanadium phosphate phase or above. Specifically, the calcination temperature is preferably 600° C.~1000° C. In addition, in order to control the amount of bivalent V in V in lithium vanadium phosphate, the atmosphere during calcination is preferably an inert gas atmosphere or reducing gas atmosphere. In addition, even in lithium aluminum titanium phosphate, the mixed powder obtained in the mixing process is also calcined. Specifically, the calcination temperature is preferably 800° C.~1000° C. In addition, the atmosphere during calcination is preferably an atmosphere in which titanium will not be reduced, in particular an atmospheric atmosphere.

(c) Crushing Process

During crushing, it becomes a process in which the materials agglutinated by reaction during the calcination process are processed to powder with appropriate particle size and distribution. The crushing method may be dry crushing without solvent, or wet crushing in solvent. The crushing method may use, for example, a planetary mixer, an attritor, a ball mill or the like. As the solvent, in order to enable the lithium vanadium phosphate to be crushed more stably, for example, organic solvents such as ethanol are preferred. The crushing time depends on the amount to be crushed. For example, it may be set to 0.5 h~32 h.

According to the preparing method described in detail above, the mixed powder of the starting materials is calcined at relatively low temperature, so the deviation of the composition can be precisely controlled. In addition, the method for preparing lithium vanadium phosphate in the present invention is not limited thereto, and other preparing methods may be adopted.

In the all-solid-state battery according to the present embodiment, a positive electrode layer 2 and a negative electrode layer 3 are laminated with a solid electrolyte layer 4 sandwiched between them. The positive electrode layer 2 consists of a packaging layer 5, a positive electrode current collector layer 6, and a positive electrode active material layer 7. The negative electrode layer 3 consists of a negative electrode active material 8, a negative electrode current collector layer 9, and a packaging layer 5. The positive electrode current collector layer 6 and the negative electrode current collector layer 9 may contain known current collectors used in lithium secondary batteries and may be prepared by adopting conventional methods.

Current Collector

The current collector layer of the all-solid-state battery according to the present embodiment preferably uses materials with high conductivity, such as silver, palladium, gold, platinum, aluminum, copper, nickel or the like. In particular, copper is difficult to react with lithium aluminum titanium phosphate, it has an effect of reducing the internal resistance of the all-solid-state battery, and thus it is preferred. As the materials forming the current collector layers, they may be the same or be different from each other in the positive electrode layer and the negative electrode layer.

In addition, the positive electrode current collector layer and the negative electrode current collector layer of the all-solid-state battery in the present embodiment respectively and preferably contain a positive electrode active material and a negative electrode active material.

By respectively containing the positive electrode active material and the negative electrode active material in the positive electrode current collector layer and the negative electrode current collector layer, the adhesion between the positive electrode current collector layer and the positive electrode active material layer and the adhesion between the negative electrode current collector layer and the negative electrode active material layer are improved, and thus they are preferred.

Method for Fabricating all-Solid-State Battery

The all-solid-state battery according to the present embodiment is fabricated by adopting the following method, i.e., processing the materials of the positive electrode current collector layer, the positive electrode active material layer, the solid electrolyte layer, the negative electrode active material layer and the negative electrode current collector layer into paste respectively, performing coating and drying to produce green sheets, laminating the green sheets, and sintering the prepared laminated body.

The paste processing method is not specially limited. For example, the powder of the materials may be mixed in the vehicle to obtain the paste. Here, the vehicle is the general term for the mediums in the liquid phase. Solvents and binders are contained in the vehicle. The paste for the positive electrode current collector layer, the paste for the positive electrode active material layer, the paste for the solid electrolyte layer, the paste for the negative electrode active material layer and the paste for the negative electrode current collector layer are prepared by adopting the method described above.

The prepared paste is coated on substrates such as PET in the desired order. After drying according to the needs, the substrates are peeled off to produce green sheets. The paste coating method is not specially limited. Well-known methods such as screen printing, coating, transfer printing and doctor blade may be adopted.

The prepared green sheets are laminated according to the desired number of layers in the desired order, and are aligned and cut off according to the need to prepare a laminated block. In the case of fabricating a parallel type or series-parallel type battery, it is preferred to align and overlap in a way that the end face of the positive electrode layer and the end face of the negative electrode layer are inconsistent.

When preparing the laminated block, the active material units described below may be prepared to prepare the laminated block.

In this method, the solid electrolyte paste is firstly coated on a PET film by using a doctor blade to form a sheet. After a solid electrolyte sheet is obtained, the positive electrode active material layer paste is printed and dried on the solid electrolyte sheet by adopting screen printing. Then, the positive electrode current collector layer paste is printed and dried thereon by adopting screen printing. The positive electrode active material layer paste is further printed and dried thereon by adopting screen printing, and then the positive electrode active material layer unit is obtained by peeling off the PET film. In this way, a positive electrode active material layer unit is obtained with the positive electrode active material layer paste, the positive electrode current collector layer paste and the positive electrode active material layer paste sequentially formed on the solid electrolyte sheet. According to the same order, the negative electrode active material unit is prepared, and a negative electrode active material unit is obtained with the negative electrode active material paste, the negative electrode current collector layer paste and the negative electrode active material paste sequentially formed on the solid electrolyte sheet.

One piece of positive electrode active material layer unit and one piece of negative electrode active material layer unit are laminated with the solid electrolyte sheet sandwiched between them. At this time, all units are staggered and laminated in a way that the positive electrode current collector layer paste of the first positive electrode active material layer unit extends only to one end face, and the negative electrode current collector layer paste of the second negative electrode active material layer unit extends only to the other end face. The two sides of the laminated units are further laminated with a solid electrolyte sheet with a specified thickness to prepare a laminated block.

The prepared laminated block is crimped at one time. Crimping is performed at the same time as heating. The heating temperature is set to 40° C.~95° C., for example.

The crimped laminated block is heated, for example, in a nitrogen, hydrogen or steam atmosphere, to 500° C.~750° C. for debindering. Then, it is heated to 600° C.-1100° C. in a nitrogen atmosphere and is sintered. The sintering time is set to 0.1 h-3 h, for example. The preparation of the laminated body is completed through the sintering.

The relative density of the sintered laminated body, the pair of electrode layers and the solid electrolyte layer arranged between the pair of electrode layers may be 80% or above. The relative density is higher, the diffusion passes of movable ions in crystals are easier to be connected and the ion conductivity is improved.

EXAMPLES

Example 1

The contents of the present invention will described more specifically with reference to the examples and comparative examples, but the present invention is not limited to the following examples.

Preparation of Positive Electrode Active Material

In order to verify the effect of the present embodiment, raw materials were weighed in a way that Li/V in lithium vanadium phosphate was 1.55. $Li_2CO_3$, $LiPO_3$, $V_2O_3$ and $NH_4H_2PO_4$ were used as starting materials. Firstly, after weighing the starting materials, mixing/crushing was performed for 16 h in ethanol by using a ball mill (120 rpm/zirconia balls). After separating and drying the mixed powder of the starting materials from the balls and ethanol, it was calcined in a crucible made of magnesium oxide. In order to control the amount of bivalent V produced in lithium vanadium phosphate, calcination was performed by changing the hydrogen content in a reducing atmosphere for 2 h at 850° C. Thereafter, the calcined powder was treated for 16 h in ethanol by using the ball mill (120 rpm/zirconia balls) for the purpose of crushing. Lithium vanadium phosphate powder was obtained by separating and drying the crushed powder from the balls and ethanol. Concerning the composition of lithium vanadium phosphate, Li/V was confirmed to be 1.55 by ICP. In addition, concerning the amount of bivalent V in V, the amount of bivalent V in lithium vanadium phosphate was confirmed to be 5% by XPS.

Preparation of Negative Electrode Active Material

As the negative electrode active material, the same powder as the positive electrode active material was used.

Preparation of Paste for Positive Electrode Active Material Layer and Paste for Negative Electrode Active Material Layer The paste for the positive electrode and negative electrode active material layers was prepared as follows, 15 parts of ethyl cellulose as a binder and 65 parts of dihydroterpineol as a solvent were added into 100 parts of lithium vanadium phosphate powder, and mixing and dispersion were performed by using a three-roll mixer to prepare the paste for the positive electrode and negative electrode active material layers.

Preparation of Paste for Solid Electrolyte Layer

As the solid electrolyte, $Li_fAl_gTi_hP_iO_j$ (wherein, f=1.3, g=0.3, h=1.7, i=3.0, j=12.0) prepared by adopting the following method was used. $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Then, 100 parts of ethanol and 200 parts of toluene as solvents were added into 100 parts of the powder by using the ball mill and wet mixing was performed. Thereafter, 16 parts of polyvinyl butyral binder and 4.8 parts of benzyl butyl phthalate were further added and mixed to prepare the paste for the solid electrolyte layer.

Preparation of Sheet for Solid Electrolyte Layer

The paste for the solid electrolyte layer was processed to form a sheet PET film as a substrate by using a doctor blade method to obtain the sheet for the solid electrolyte layer with a thickness of 15 μm.

Preparation of Paste for Positive Electrode Current Collector Layer and Paste for Negative Electrode Current Collector Layer After mixing Cu powder and lithium vanadium phosphate powder according to a weight ratio of 100:9, 10 parts of ethyl cellulose as a binder and 50 parts of dihydroterpineol as a solvent were added, and mixing and dispersion were performed by using a three-roll mixer to prepare the paste for the positive electrode current collector layer and the paste for the negative electrode current collector layer.

Preparation of Active Material Layer Unit

The paste for the electrode current collector layers with a thickness of 5 μm was printed on the sheet for the solid electrolyte layer by adopting screen printing, and then dried for 10 min at 80° C. The paste for the positive electrode active material layer with a thickness of 5 μm was printed by adopting screen printing, and then dried for 10 min at 80° C. to obtain the positive electrode layer unit. On the other hand, the paste for the negative electrode active material layer with a thickness of 5 μm was printed on the sheet for the solid electrolyte layer by adopting screen printing, and then dried for 10 min at 80° C. Then the paste for the electrode current collector layer with a thickness of 5 μm was printed thereon by adopting screen printing, and then dried for 10 min at 80° C. to obtain the negative electrode layer unit. Then the PET film was peeled off.

Preparation of Laminated Body

The positive electrode layer unit, the negative electrode layer unit and the sheet for the solid electrolyte layer were used to obtain a laminated body by laminating in a way of sequentially forming the solid electrolyte layer, the positive electrode current collector layer, the positive electrode active material layer, the solid electrolyte layer, the negative electrode active material layer, the negative electrode current collector layer and the solid electrolyte layer. At this time, all units were alternately laminated in a way that the positive electrode current collector layer of the positive electrode layer unit extended only to one end face, and the negative electrode current collector layer of the negative electrode active material layer unit extended only to the other end face. Thereafter, hot crimping was performed and then cutting was performed to prepare the laminated body.

Preparation of Sintered Body

After debindering the obtained laminated body, simultaneous sintering was performed to obtain the sintered body. The debindering was performed by heating to the sintering temperature of 700° C. at a speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 1. The threshold of the sufficient discharge characteristics in use was 2.5 μAh.

Example 2

In this example, raw materials were weighed in a way that Li/V of lithium vanadium phosphate was 1.70, and the lithium vanadium phosphate powder was prepared by adopting the same method as in example 1. Concerning the composition of lithium vanadium phosphate, Li/V was confirmed to be 1.70 by ICP. In addition, in terms of the amount of bivalent V contained in V, the amount of the bivalent V in the lithium vanadium phosphate was confirmed to be 20% by XPS. After the laminated body was prepared by adopting the same method as in example 1, debindering and sintering were performed by adopting the same method. The discharge characteristics of the laminated body were evaluated by adopting the same method as in example 1. The determined discharge capacity was shown in Table 1.

Example 3

In this example, raw materials were weighed in a way that Li/V of lithium vanadium phosphate was 1.80, and the lithium vanadium phosphate powder was prepared by adopting the same method as in example 1. Concerning the composition of lithium vanadium phosphate, Li/V was confirmed to be 1.80 by ICP. In addition, in terms of the amount of bivalent V contained in V, the amount of the bivalent V in the lithium vanadium phosphate was confirmed to be 33% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

Example 4

In this example, raw materials were weighed in a way that Li/V of lithium vanadium phosphate was 1.93, and the lithium vanadium phosphate powder was prepared by adopting the same method as in example 1. Concerning the composition of lithium vanadium phosphate, Li/V was confirmed to be 1.93 by ICP. In addition, in terms of the amount of bivalent V contained in V, the amount of the bivalent V in the lithium vanadium phosphate was confirmed to be 49% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

Example 5

In this example, raw materials were weighed in a way that Li/V of lithium vanadium phosphate was 2.30, and the lithium vanadium phosphate powder was prepared by adopting the same method as in example 1. Concerning the composition of lithium vanadium phosphate, Li/V was confirmed to be 2.30 by ICP. In addition, in terms of the amount of bivalent V contained in V, the amount of the bivalent V in the lithium vanadium phosphate was confirmed to be 78% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

Comparative Example 1

In this comparative example, raw materials were weighed in a way that Li/V of lithium vanadium phosphate was 1.48, and the lithium vanadium phosphate powder was prepared by adopting the same method as in example 1. Concerning the composition of lithium vanadium phosphate, Li/V was confirmed to be 1.48 by ICP. In addition, in terms of the amount of bivalent V contained in V, the amount of the bivalent V in the lithium vanadium phosphate was confirmed to be 1% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

Comparative Example 2

In this comparative example, raw materials were weighed in a way that Li/V of lithium vanadium phosphate was 2.60, and the lithium vanadium phosphate powder was prepared by adopting the same method as in example 1. Concerning the composition of lithium vanadium phosphate, Li/V was confirmed to be 2.60 by ICP. In addition, in terms of the amount of bivalent V contained in V, the amount of the bivalent V in the lithium vanadium phosphate was confirmed to be 85% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

Comparative Example 3

In this comparative example, raw materials were weighed in a way that Li/V of lithium vanadium phosphate was 1.00, and the lithium vanadium phosphate powder was prepared by adopting the same method as in example 1. Concerning the composition of lithium vanadium phosphate, Li/V was confirmed to be 1.00 by ICP. In addition, in terms of the amount of bivalent V contained in V, the amount of the bivalent V in the lithium vanadium phosphate was confirmed to be 20% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

Comparative Example 4

In this comparative example, raw materials were weighed in a way that Li/V of lithium vanadium phosphate was 2.00, and the lithium vanadium phosphate powder was prepared by adopting the same method as in example 1. Concerning the composition of lithium vanadium phosphate, Li/V was confirmed to be 2.00 by ICP. In addition, in terms of the amount of bivalent V contained in V, the amount of the bivalent V in the lithium vanadium phosphate was confirmed to be 1% by XPS. After the laminated body was prepared by adopting the same method as in example 1, debindering and sintering were performed according to the same method. The discharge characteristics of the laminated body were evaluated by adopting the same method as in example 1. The determined discharge capacity was shown in Table 1.

From Table 1, it can be seen that the all-solid-state battery which uses the lithium vanadium phosphate with Li/V and bivalent V in the range specified in the present invention for the active material layer can obtain significantly higher discharge capacity.

TABLE 1

|  | Li/V | Proportion of bivalent V (%) | $Li_f Al_g Ti_h P_i O_j$ | | | | | Discharge capacity of fabricated battery (μAh) |
|  |  |  | f | g | h | i | j |  |
| --- | --- | --- | --- | --- | --- | --- | --- | --- |
| Example 1 | 1.55 | 5 | 1.30 | 0.30 | 1.70 | 3.00 | 12.00 | 4.82 |
| Example 2 | 1.70 | 20 | 1.30 | 0.30 | 1.70 | 3.00 | 12.00 | 5.82 |
| Example 3 | 1.80 | 33 | 1.30 | 0.30 | 1.70 | 3.00 | 12.00 | 5.86 |
| Example 4 | 1.93 | 49 | 1.30 | 0.30 | 1.70 | 3.00 | 12.00 | 5.70 |
| Example 5 | 2.30 | 78 | 1.30 | 0.30 | 1.70 | 3.00 | 12.00 | 4.28 |
| Comparative example 1 | 1.48 | 1 | 1.30 | 0.30 | 1.70 | 3.00 | 12.00 | 2.45 |
| Comparative example 2 | 2.60 | 85 | 1.30 | 0.30 | 1.70 | 3.00 | 12.00 | 2.38 |
| Comparative example 3 | 1.00 | 20 | 1.30 | 0.30 | 1.70 | 3.00 | 12.00 | 1.75 |
| Comparative example 4 | 2.00 | 1 | 1.30 | 0.30 | 1.70 | 3.00 | 12.00 | 2.10 |

Example 6

Preparation of Positive Electrode Active Material

In order to verify the effect of the present embodiment, raw materials were weighed in a way that Li/V in lithium vanadium phosphate was 1.80. $Li_2CO_3$, $LiPO_3$, $V_2O_3$ and $NH_4H_2PO_4$ were used as starting materials. Firstly, after weighing the starting materials, mixing/crushing was performed for 16 h in ethanol by using a ball mill (120 rpm/zirconia balls). After separating and drying the mixed powder of the starting materials from the balls and ethanol, it was calcined in a crucible made of magnesium oxide. In order to control the amount of bivalent V produced in lithium vanadium phosphate, calcination was performed by changing the hydrogen content in a reducing atmosphere for 2 h at 850° C. Thereafter, the calcined powder was treated for 16 h in ethanol by using the ball mill (120 rpm/zirconia balls) for the purpose of crushing. Lithium vanadium phosphate powder was obtained by separating and drying the crushed powder from the balls and ethanol. Concerning the composition of lithium vanadium phosphate, Li/V was confirmed to be 1.80 by ICP. In addition, concerning the amount of bivalent V in V, the amount of bivalent V in each lithium vanadium phosphate was confirmed to be 33% by XPS.

Preparation of Negative Electrode Active Material

As the negative electrode active material, the same powder as the positive electrode active material was used.

Preparation of Paste for Positive Electrode Active Material Layer and Paste for Negative Electrode Active Material Layer The paste for the positive electrode and negative electrode active material layers was prepared as follows, 15 parts of ethyl cellulose as a binder and 65 parts of dihydroterpineol as a solvent were added into 100 parts of lithium vanadium phosphate powder, and mixing and dispersion were performed by using a three-roll mixer to prepare the paste for the positive electrode and negative electrode active material layers.

Preparation of Paste for Solid Electrolyte Layer

Concerning the lithium aluminum titanium phosphate used as the solid electrolyte, it was weighed in a way of ensuring f=1.02, g=0.13, h=1.91, i=3.0, j=12.03 in the composition of $Li_fAl_gTi_hP_iO_j$, $Li_2CO_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Then, 100 parts of ethanol and 200 parts of toluene as solvents were added into 100 parts of the powder by using the ball mill and wet mixing was performed. Thereafter, 16 parts of polyvinyl butyral binder and 4.8 parts of benzyl butyl phthalate were further added and mixed to prepare the paste for the solid electrolyte layer.

The paste for the solid electrolyte layer was processed to form a sheet PET film as a substrate by using a doctor blade method to obtain the sheet for the solid electrolyte layer with a thickness of 15 µm.

Preparation of Paste for Positive Electrode Current Collector Layer and Paste for Negative Electrode Current Collector Layer After mixing Cu powder and lithium vanadium phosphate powder according to a weight ratio of 100:9, 10 parts of ethyl cellulose as a binder and 50 parts of dihydroterpineol as a solvent were added, and mixing and dispersion were performed by using a three-roll mixer to prepare the paste for the current collector layers.

Preparation of Active Material Layer Unit

The paste for the positive electrode current collector layer with a thickness of 5 µm was printed on the sheet for the solid electrolyte layer by adopting screen printing, and then dried for 10 min at 80° C. The paste for the positive electrode active material layer with a thickness of 5 µm was printed by adopting screen printing, and then dried for 10 min at 80° C. to obtain the positive electrode layer unit. On the other hand, the paste for the negative electrode active material layer with a thickness of 5 µm was printed on the sheet for the solid electrolyte layer by adopting screen printing, and then dried for 10 min at 80° C. Then the paste for the negative electrode current collector layer with a thickness of 5 µm was printed thereon by adopting screen printing, and then dried for 10 min at 80° C. to obtain the negative electrode layer unit. Then the PET film was peeled off.

Preparation of Laminated Body

The positive electrode layer unit, the negative electrode layer unit and the sheet for the solid electrolyte layer were used to obtain a laminated body by laminating in a way of sequentially forming the solid electrolyte layer, the positive electrode current collector layer, the positive electrode active material layer, the solid electrolyte layer, the negative electrode active material layer, the negative electrode current collector layer and the solid electrolyte layer. At this time, all units were alternately laminated in a way that the positive electrode current collector layer of the positive electrode layer unit extended only to one end face, and the negative electrode current collector layer of the negative electrode active material layer unit extended only to the other end face. Thereafter, hot crimping was performed and then cutting was performed to prepare the laminated body.

Preparation of Sintered Body

After debindering the obtained laminated body, simultaneous sintering was performed to obtain the sintered body. The debindering was performed by heating to the sintering temperature of 700° C. at a speed of 50° C./h in nitrogen, and maintaining at this temperature for 10 hours. The simultaneous sintering was performed by heating to the sintering temperature 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 2. The threshold of the sufficient discharge characteristics in use was 2.5 µAh.

Example 7

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=1.5, g=0.5, h=1.5, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 8

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=2.0, g=1.0, h=1.0, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 9

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=2.1, g=1.1, h=0.9, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 10

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=0.5, g=0.02, h=1.0, i=2.8, j=9.28 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 11

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=0.5, g=0.02, h=2.0, i=3.2, j=12.28 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 12

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=0.5, g=1.0, h=1.0, i=2.8, j=10.75 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 13

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=0.5, g=1.0, h=2.0, i=3.2, j=13.75 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 14

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=3.0, g=0.1, h=1.0, i=2.8, j=10.65 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 15

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=3.0, g=0.1, h=2.0, i=3.2, j=13.65 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 16

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=3.0, g=1.0, h=1.0, i=2.8, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Example 17

Preparation of Positive Electrode Active Material and Negative Electrode Active Material In order to verify the effect of the present embodiment, raw materials were weighed in a way that Li/V in lithium vanadium phosphate was 1.80, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=3.0, g=1.0, h=2.0, i=3.2, j=15.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 5

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=1.02, g=0.13, h=1.91, i=3.0, j=12.03 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 6

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=1.5, g=0.5, h=1.5, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 7

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=2.0, g=1.0, h=1.0, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 8

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=0.5, g=0.02, h=1.0, i=2.8, j=9.28 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 9

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=0.5, g=1.0, h=2.0, i=3.2, j=13.75 in the composition of $Li_fAl_gTi_hP_iO_j$. $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 10

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=3.0, g=0.1, h=1.0, i=2.8, j=10.65 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

Comparative Example 11

Preparation of Positive Electrode Active Material and Negative Electrode Active Material As the comparative example, raw materials were weighed in a way that Li/V in lithium vanadium phosphate was 1.48, and lithium vanadium phosphate powder was obtained by adopting the same method as in Example 6. Further, the lithium vanadium phosphate powder was used for preparing the paste for the positive electrode and negative electrode active materials by adopting the same method as in Example 6.

Preparation of Paste for Solid Electrolyte Layer

Concerning the lithium aluminum titanium phosphate used as the solid electrolyte, it was weighed in a way of ensuring f=3.0, g=1.0, h=2.0, i=3.2, j=15.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder. Further, after preparing the laminated body by adopting the same method as in Example 6, debindering and sintering were performed by adopting the same method. The discharge characteristics of the laminated body were evaluated by adopting the same method as in Example 6. The determined discharge capacity was shown in Table 2.

From Table 2, it can be seen that the all-solid-state battery which uses lithium aluminum titanium phosphate as the solid electrolyte can obtain significantly high discharge capacity under the situation that the lithium vanadium phosphate with Li/V and bivalent V in the range specified in the present invention is used in the active material layer.

TABLE 2

| | Proportion of | | $Li_fAl_gTi_hP_iO_j$ | | | | | Discharge capacity of fabricated |
|---|---|---|---|---|---|---|---|---|
| | Li/V | bivalent V (%) | f | g | h | i | j | battery (μAh) |
| Example 6 | 1.80 | 33 | 1.02 | 0.13 | 1.91 | 3.00 | 12.03 | 4.98 |
| Example 7 | 1.80 | 33 | 1.50 | 0.50 | 1.50 | 3.00 | 12.00 | 3.81 |
| Example 8 | 1.80 | 33 | 2.00 | 1.00 | 1.00 | 3.00 | 12.00 | 2.65 |
| Example 9 | 1.80 | 33 | 2.10 | 1.10 | 0.90 | 3.00 | 12.00 | 2.57 |
| Example 10 | 1.80 | 33 | 0.50 | 0.02 | 1.00 | 2.80 | 9.28 | 2.99 |
| Example 11 | 1.80 | 33 | 0.50 | 0.02 | 2.00 | 3.20 | 12.28 | 3.24 |
| Example 12 | 1.80 | 33 | 0.50 | 1.00 | 1.00 | 2.80 | 10.75 | 2.78 |
| Example 13 | 1.80 | 33 | 0.50 | 1.00 | 2.00 | 3.20 | 13.75 | 2.53 |
| Example 14 | 1.80 | 33 | 3.00 | 0.10 | 1.00 | 2.80 | 10.65 | 2.83 |
| Example 15 | 1.80 | 33 | 3.00 | 0.10 | 2.00 | 3.20 | 13.65 | 2.52 |
| Example 16 | 1.80 | 33 | 3.00 | 1.00 | 1.00 | 2.80 | 12.00 | 2.70 |
| Example 17 | 1.80 | 33 | 3.00 | 1.00 | 2.00 | 3.20 | 15.00 | 2.54 |
| Comparative example 5 | 1.48 | 1 | 1.02 | 0.13 | 1.91 | 3.00 | 12.03 | 1.61 |
| Comparative example 6 | 1.48 | 1 | 1.50 | 0.50 | 1.50 | 3.00 | 12.00 | 1.23 |
| Comparative example 7 | 1.48 | 1 | 2.00 | 1.00 | 1.00 | 3.00 | 12.00 | 0.76 |
| Comparative example 8 | 1.48 | 1 | 0.50 | 0.02 | 1.00 | 2.80 | 9.28 | 1.05 |
| Comparative example 9 | 1.48 | 1 | 0.50 | 1.00 | 2.00 | 3.20 | 13.75 | 0.88 |
| Comparative example 10 | 1.48 | 1 | 3.00 | 0.10 | 1.00 | 2.80 | 10.65 | 0.99 |
| Comparative example 11 | 1.48 | 1 | 3.00 | 1.00 | 2.00 | 3.20 | 15.00 | 0.89 |

Example 18

Preparation of Positive Electrode Active Material

In order to verify the effect of the present embodiment, raw materials were weighed in a way that Li/V in lithium vanadium phosphate was 1.93. $Li_2CO_3$, $LiPO_3$, $V_2O_3$ and $NH_4H_2PO_4$ were used as starting materials. Firstly, after weighing the starting materials, mixing/crushing was performed for 16 h in ethanol by using a ball mill (120 rpm/zirconia balls). After separating and drying the mixed powder of the starting materials from the balls and ethanol, it was calcined in a crucible made of magnesium oxide. In order to control the amount of bivalent V produced in lithium vanadium phosphate, calcination was performed by changing the hydrogen content in a reducing atmosphere for 2 h at 850° C. Thereafter, the calcined powder was treated for 16 h in ethanol by using the ball mill (120 rpm/zirconia balls) for the purpose of crushing. Lithium vanadium phosphate powder was obtained by separating and drying the crushed powder from the balls and ethanol. Concerning the composition of lithium vanadium phosphate, Li/V was confirmed to be 1.93 by ICP. In addition, concerning the amount of bivalent V in V, the amount of bivalent V in each lithium vanadium phosphate was confirmed to be 49% by XPS.

Preparation of Negative Electrode Active Material

In order to verify the effect of the present embodiment, raw materials were weighed in a way that Li/V in lithium vanadium phosphate was 1.70. $Li_2CO_3$, $LiPO_3$, $V_2O_3$ and $NH_4H_2PO_4$ were used as starting materials. Firstly, after weighing the starting materials, mixing/crushing was performed for 16 h in ethanol by using a ball mill (120 rpm/zirconia balls). After separating and drying the mixed powder of the starting materials from the balls and ethanol, it was calcined in a crucible made of magnesium oxide. In order to control the amount of bivalent V produced in lithium vanadium phosphate, calcination was performed by changing the hydrogen content in a reducing atmosphere for 2 h at 850° C. Thereafter, the calcined powder was treated for 16 h in ethanol by using the ball mill (120 rpm/zirconia balls) for the purpose of crushing. Lithium vanadium phosphate powder was obtained by separating and drying the crushed powder from the balls and ethanol. Concerning the composition of lithium vanadium phosphate, Li/V was confirmed to be 1.70 by ICP. In addition, in terms of the amount of bivalent V contained in V, the amount of bivalent V in each lithium vanadium phosphate was confirmed to be 20% by XPS.

Preparation of Paste for Positive Electrode Active Material Layer

The paste for the positive electrode active material layer was prepared by using lithium vanadium phosphate powder with Li/V of 1.93 and an amount of bivalent V of 49%. The paste for the positive electrode active material layer was prepared as follows, 15 parts of ethyl cellulose as a binder and 65 parts of dihydroterpineol as a solvent were added into 100 parts of lithium vanadium phosphate powder, and mixing and dispersion were performed by using a three-roll mixer to prepare the paste for the positive electrode active material layer.

Preparation of Paste for Negative Electrode Active Material Layer

The paste for the negative electrode active material layer was prepared by using lithium vanadium phosphate powder with Li/V of 1.70 and an amount of bivalent V of 20%. The paste for the negative electrode active material layer was prepared as follows, 15 parts of ethyl cellulose as a binder and 65 parts of dihydroterpineol as a solvent were added into 100 parts of lithium vanadium phosphate powder, and mixing and dispersion were performed by using a three-roll mixer to prepare the paste for the negative electrode active material layer.

Preparation of Paste for Solid Electrolyte Layer

Concerning the lithium aluminum titanium phosphate used as the solid electrolyte, it was weighed in a way of ensuring f=1.3, g=0.3, h=1.7, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Then, 100 parts of ethanol and 200 parts of toluene as solvents were added into 100 parts of the powder by using the ball mill and wet mixing was performed. Thereafter, 16 parts of polyvinyl butyral binder and 4.8 parts of benzyl butyl phthalate were further added and mixed to prepare the paste for the solid electrolyte layer.

The paste for the solid electrolyte layer was processed to form a sheet PET film as a substrate by using a doctor blade method to obtain the sheet for the solid electrolyte layer with a thickness of 15 nm.

Preparation of Paste for Positive Electrode Current Collector Layer and Paste for Negative Electrode Current Collector Layer

After mixing Cu powder used as the positive electrode current collector and lithium vanadium phosphate powder with Li/V of 1.93, and mixing Cu powder used as the negative electrode current collector and lithium vanadium phosphate powder with Li/V of 1.70 according to a weight ratio of 100:9, 10 parts of ethyl cellulose as a binder and 50 parts of dihydroterpineol as a solvent were added, and mixing and dispersion were performed by using a three-roll mixer to prepare the paste for the positive electrode current collector layer and the paste for the negative electrode current collector layer.

Preparation of Active Material Unit

The paste for the positive electrode current collector layer with a thickness of 5 μm was printed on the sheet for the solid electrolyte layer by adopting screen printing, and then dried for 10 min at 80° C. The paste for the positive electrode active material layer with a thickness of 5 nm was printed by adopting screen printing, and then dried for 10 min at 80° C. to obtain the positive electrode layer unit. On the other hand, the paste for the negative electrode active material layer with a thickness of 5 μm was printed on the sheet for the solid electrolyte layer by adopting screen printing, then dried for 10 min at 80° C., then the paste for the negative electrode current collector layer with a thickness of 5 μm was printed thereon by adopting screen printing, and then dried for 10 min at 80° C. to obtain the negative electrode layer unit. Then the PET film was peeled off.

Preparation of Laminated Body

The positive electrode layer unit, the negative electrode layer unit and the sheet for the solid electrolyte layer were used to obtain a laminated body by laminating in a way of sequentially forming the solid electrolyte layer, the positive electrode current collector layer, the positive electrode active material layer, the solid electrolyte layer, the negative electrode active material layer, the negative electrode current collector layer and the solid electrolyte layer. At this time, all units were alternately laminated in a way that the positive electrode current collector layer of the positive electrode layer unit extended only to one end face, and the negative electrode current collector layer of the negative electrode active material layer unit extended only to the other end face. Thereafter, hot crimping was performed and then cutting was performed to prepare the laminated body.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 3. The threshold of the sufficient discharge characteristics in use was 2.5 μAh.

Example 19

In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.55. For these materials, lithium vanadium phosphate powder was prepared by adopting the same method as in Example 18. Concerning the composition of lithium vanadium phosphate, Li/V was confirmed to be 2.30 and 1.55 by ICP. In addition, in terms of the amount of bivalent V contained in V, the amount of bivalent V in lithium vanadium phosphate was confirmed to be 78% and 5% by XPS. Further, after the laminated body was prepared by adopting the same method as in Example 18, debindering and sintering were performed by adopting the same method. The discharge characteristics of the laminated body were evaluated by adopting the same method as in Example 18. The determined discharge capacity was shown in Table 3.

Example 20

In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 18. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS. Further, after the laminated body was prepared by adopting the same method as in Example 18, debindering and sintering were performed by adopting the same method. The discharge characteristics of the laminated body were evaluated by adopting the same method as in Example 18. The determined discharge capacity was shown in Table 3.

Example 21

In this example, for the paste for the positive electrode active material layer and the paste for the positive electrode current collector layer, raw materials were weighed in a way that Li/V of lithium vanadium phosphate was 1.70. In addition, for the paste for the negative electrode active material layer and the paste for the negative electrode current collector layer, raw materials were weighed in a way that Li/V of lithium vanadium phosphate was 1.55. For these materials, lithium vanadium phosphate powder was prepared by adopting the same method as in Example 18. Concerning the composition of lithium vanadium phosphate, Li/V was confirmed to be 1.70 and 1.55 by ICP. In addition, in terms of the amount of bivalent V contained in V, the amount of bivalent V in lithium vanadium phosphate was confirmed to be 20% and 5% by XPS. Further, after the laminated body was prepared by adopting the same method as in Example 18, debindering and sintering were performed by adopting the same method. The discharge characteristics of the laminated body were evaluated by adopting the same method as in Example 18. The determined discharge capacity was shown in Table 3.

Comparative Example 12

In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 18. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS. Further, after the laminated body was prepared by adopting the same method as in Example 18, debindering and sintering were performed by adopting the same method. The discharge characteristics of the laminated body were evaluated by adopting the same method as in Example 18. The determined discharge capacity was shown in Table 3.

Comparative Example 13

In this comparative example, for the paste for the positive electrode active material layer and the paste for the positive electrode current collector layer, raw materials were weighed in a way that Li/V of lithium vanadium phosphate was 1.80. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 18. Concerning the composition of lithium vanadium phosphate, Li/V was confirmed to be 1.80 and 1.48 by ICP. In addition, in terms of the amount of bivalent V contained in V, the amount of bivalent V in lithium vanadium phosphate was confirmed to be 33% and 1% by XPS. Further, after the laminated body was prepared by adopting the same method as in Example 18, debindering and sintering were performed by adopting the same method. The discharge characteristics of the laminated body were evaluated by adopting the same method as in Example 18. The determined discharge capacity was shown in Table 3.

From Table 3, it can be seen that the all-solid-state battery which respectively uses the lithium vanadium phosphate with Li/V and bivalent V in the range specified in the present invention for the positive electrode active material layer and the negative electrode active material layer can obtain significantly high discharge capacity.

$NH_4H_2PO_4$ were used as starting materials. Firstly, after weighing the starting materials, mixing/crushing was performed for 16 h in ethanol by using a ball mill (120 rpm/zirconia balls). After separating and drying the mixed powder of the starting materials from the balls and ethanol, it was calcined in a crucible made of magnesium oxide. In order to control the amount of bivalent V produced in lithium vanadium phosphate, calcination was performed by changing the hydrogen content in a reducing atmosphere for 2 h at 850° C. Thereafter, the calcined powder was treated for 16 h in ethanol by using the ball mill (120 rpm/zirconia balls) for the purpose of crushing. Lithium vanadium phosphate powder was obtained by separating and drying the crushed powder from the balls and ethanol. Concerning the composition of lithium vanadium phosphate, Li/V was confirmed to be 1.80 by ICP. In addition, in terms of the amount of bivalent V contained in V, the amount of bivalent V in each lithium vanadium phosphate was confirmed to be 33% by XPS.

Preparation of Paste for Positive Electrode Active Material Layer

The paste for the positive electrode active material layer was prepared by using lithium vanadium phosphate powder

TABLE 3

| | Positive electrode: Li/V | Positive electrode: proportion of bivalent V (%) | Negative electrode: Li/V | Negative electrode: proportion of bivalent V | $Li_fAl_gTi_hP_iO_j$ | | | | | Charge capacity of fabricated battery (μAh) |
|---|---|---|---|---|---|---|---|---|---|---|
| | | | | | f | g | h | i | j | |
| Example 18 | 1.93 | 49 | 1.70 | 20 | 1.30 | 0.30 | 1.70 | 3.00 | 12.00 | 6.91 |
| Example 19 | 2.30 | 78 | 1.55 | 5 | 1.30 | 0.30 | 1.70 | 3.00 | 12.00 | 5.46 |
| Example 20 | 2.30 | 78 | 1.80 | 33 | 1.30 | 0.30 | 1.70 | 3.00 | 12.00 | 6.08 |
| Example 21 | 1.70 | 20 | 1.55 | 5 | 1.30 | 0.30 | 1.70 | 3.00 | 12.00 | 6.38 |
| Comparative example 12 | 2.60 | 85 | 1.48 | 1 | 1.30 | 0.30 | 1.70 | 3.00 | 12.00 | 1.33 |
| Comparative example 13 | 1.80 | 33 | 1.48 | 1 | 1.30 | 0.30 | 1.70 | 3.00 | 12.00 | 2.29 |

Example 22

Preparation of Positive Electrode Active Material

In order to verify the effect of the present embodiment, raw materials were weighed in a way that Li/V in lithium vanadium phosphate was 2.30. $Li_2CO_3$, $LiPO_3$, $V_2O_3$ and $NH_4H_2PO_4$ were used as starting materials. Firstly, after weighing the starting materials, mixing/crushing was performed for 16 h in ethanol by using a ball mill (120 rpm/zirconia balls). After separating and drying the mixed powder of the starting materials from the balls and ethanol, it was calcined in a crucible made of magnesium oxide. In order to control the amount of bivalent V produced in lithium vanadium phosphate, calcination was performed by changing the hydrogen content in a reducing atmosphere for 2 h at 850° C. Thereafter, the calcined powder was treated for 16 h in ethanol by using the ball mill (120 rpm/zirconia balls) for the purpose of crushing. Lithium vanadium phosphate powder was obtained by separating and drying the crushed powder from the balls and ethanol. Concerning the composition of lithium vanadium phosphate, Li/V was confirmed to be 2.30 by ICP. In addition, in terms of the amount of bivalent V contained in V, the amount of bivalent V in each lithium vanadium phosphate was confirmed to be 78% by XPS.

Preparation of Negative Electrode Active Material

In order to verify the effect of the present embodiment, raw materials were weighed in a way that Li/V in lithium vanadium phosphate was 1.80. $Li_2CO_3$, $LiPO_3$, $V_2O_3$ and with Li/V of 2.30 and an amount of bivalent V of 78%. The paste for the positive electrode active material layer was prepared as follows, 15 parts of ethyl cellulose as a binder and 65 parts of dihydroterpineol as a solvent were added into 100 parts of lithium vanadium phosphate powder, and mixing and dispersion were performed by using a three-roll mixer to prepare the paste for the positive electrode active material layer.

Preparation of Paste for Negative Electrode Active Material Layer

The paste for the negative electrode active material layer was prepared by using lithium vanadium phosphate powder with Li/V of 1.80 and an amount of bivalent V of 33%. The paste for the negative electrode active material layer was prepared as follows, 15 parts of ethyl cellulose as a binder and 65 parts of dihydroterpineol as a solvent were added into 100 parts of lithium vanadium phosphate powder, and mixing and dispersion were performed by using a three-roll mixer to prepare the paste for the negative electrode active material layer.

Preparation of Paste for Solid Electrolyte Layer

Concerning the lithium aluminum titanium phosphate used as the solid electrolyte, it was weighed in a way of ensuring f=1.02, g=0.13, h=1.91, i=3.0, j=12.03 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Then, 100 parts of ethanol and 200 parts of toluene as solvents were added into 100 parts of the powder by using the ball mill and wet mixing was performed. Thereafter, 16 parts of polyvinyl butyral binder and 4.8 parts of benzyl butyl phthalate were further added and mixed to prepare the paste for the solid electrolyte layer.

The paste for the solid electrolyte layer was processed to form a sheet PET film as a substrate by using a doctor blade method to obtain the sheet for the solid electrolyte layer with a thickness of 15 μm.

Preparation of Paste for Positive Electrode Current Collector Layer and Paste for Negative Electrode Current Collector Layer After mixing Cu powder used as the positive electrode current collector and lithium vanadium phosphate powder with Li/V of 2.30, and mixing Cu powder used as the negative electrode current collector and lithium vanadium phosphate powder with Li/V of 1.80 according to a weight ratio of 100:9, 10 parts of ethyl cellulose as a binder and 50 parts of dihydroterpineol as a solvent were added, and mixing and dispersion were performed by using a three-roll mixer to prepare the paste for the positive electrode current collector layer and the paste for the negative electrode current collector layer.

Preparation of Active Material Layer Unit

The paste for the positive electrode current collector layer with a thickness of 5 μm was printed on the sheet for the solid electrolyte layer by adopting screen printing, and then dried for 10 min at 80° C. The paste for the positive electrode active material layer with a thickness of 5 μm was printed by adopting screen printing, and then dried for 10 min at 80° C. to obtain the positive electrode layer unit. On the other hand, the paste for the negative electrode active material with a thickness of 5 μm was printed on the sheet for the solid electrolyte layer by adopting screen printing, then dried for 10 min at 80° C., then the paste for the negative electrode current collector layer with a thickness of 5 μm was printed thereon by adopting screen printing, and then dried for 10 min at 80° C. to obtain the negative electrode layer unit. Then the PET film was peeled off.

Preparation of Laminated Body

The positive electrode layer unit, the negative electrode layer unit and the sheet for the solid electrolyte layer were used to obtain a laminated body by laminating in a way of sequentially forming the solid electrolyte layer, the positive electrode current collector layer, the positive electrode active material layer, the solid electrolyte layer, the negative electrode active material layer, the negative electrode current collector layer and the solid electrolyte layer. At this time, all units were alternately laminated in a way that the positive electrode current collector layer of the positive electrode layer unit extended only to one end face, and the negative electrode current collector layer of the negative electrode active material layer unit extended only to the other end face. Thereafter, hot crimping was performed and then cutting was performed to prepare the laminated body.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Example 23

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=1.5, g=0.5, h=1.5, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to the sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Example 24

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=2.0, g=1.0, h=1.0, i=3.0, j=12.0 in the composition of $Li_fAl_gTi_h$-$P_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 21 μA and voltage of 0V~0.8V. The determined discharge capacity was shown in Table 4. The threshold of the sufficient discharge characteristics in use was 2.5 μAh.

Example 25

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=2.1, g=1.1, h=0.9, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 15.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Example 26

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=0.5, g=0.02, h=1.0, i=2.8, j=9.28 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Example 27

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=0.5, g=0.02, h=2.0, i=3.2, j=12.28 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Example 28

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning lithium aluminum titanium phosphate used as the solid electrolyte, it was weighed in a way of ensuring f=0.5, g=1.0, h=1.0, i=2.8, j=10.75 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 21 μA and voltage of 0V~1.8V. The determined discharge capacity was shown in Table 4. The threshold of the sufficient discharge characteristics in use was 2.5 μAh.

Example 29

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=0.5, g=1.0, h=2.0, i=3.2, j=13.75 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Example 30

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning lithium aluminum titanium phosphate used as the solid electrolyte, it was weighed in a way of ensuring f=3.0, g=0.1, h=1.0, i=2.8, j=10.65 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Example 31

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=3.0, g=0.1, h=2.0, i=3.2, j=13.65 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Example 32

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

Concerning lithium aluminum titanium phosphate used as the solid electrolyte, it was weighed in a way of ensuring f=3.0, g=1.0, h=1.0, i=2.8, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 21 µA and voltage of 0V~1.8V. The determined discharge capacity was shown in Table 4. The threshold of the sufficient discharge characteristics in use was 2.5 µAh.

Example 33

Preparation of Positive Electrode Active Material and Negative Electrode Active Material In this example, for the paste for the positive electrode active material layer and the paste for the positive electrode current collector layer, raw materials were weighed in a way that Li/V of lithium vanadium phosphate was 2.30. In addition, for the paste for the negative electrode active material layer and the paste for the negative electrode current collector layer, raw materials were weighed in a way that Li/V of lithium vanadium phosphate was 1.80. For these materials, lithium vanadium phosphate powder was prepared by adopting the same method as in Example 22. Concerning the composition of lithium vanadium phosphate, Li/V was confirmed to be 2.30 and 1.80 by ICP. In addition, in terms of the amount of bivalent V contained in V, the amount of bivalent V in lithium vanadium phosphate was confirmed to be 78% and 33% by XPS.

Preparation of Paste for Positive Electrode Active Material Layer and Paste for Negative Electrode Active Material Layer Lithium vanadium phosphate powder with Li/V of 2.30 and lithium vanadium phosphate powder with Li/V of 1.80 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=3.0, g=1.0, h=2.0, i=3.2, j=15.0 in the composition of $Li_fAl_gTi_h$-$P_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.30, lithium vanadium phosphate powder with Li/V of 1.80 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Comparative Example 14

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=1.02, g=0.13, h=1.91, i=3.0, j=12.03 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Comparative Example 15

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=1.5, g=0.5, h=1.5, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Comparative Example 16

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

Concerning the lithium aluminum titanium phosphate used as the solid electrolyte, it was weighed in a way of ensuring f=2.0, g=1.0, h=1.0, i=3.0, j=12.0 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of charge-discharge characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Comparative Example 17

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=0.5, g=0.02, h=0.0, i=2.8, j=9.28 in the composition of $Li_fAl_g Ti_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

Comparative Example 18

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, with respect to the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=0.5, g=1.0, h=2.0, i=3.2, j=13.75 in the composition of $Li_fAl_g Ti_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 μA and voltage of 0V~1.8V. The determined discharge capacity was shown in Table 4. The threshold of the sufficient discharge characteristics in use was 2.5 μAh.

Comparative Example 19

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

Concerning lithium aluminum titanium phosphate used as the solid electrolyte, it was weighed in a way of ensuring f=3.0, g=0.1, h=1.0, i=2.8, j=10.65 in the composition of $Li_fAl_gTi_hP_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 21 μA and voltage of 0V~1.8V. The determined discharge capacity was shown in Table 4, The threshold of the sufficient discharge characteristics in use was 2.5 μAh.

Comparative Example 20

Preparation of Positive Electrode Active Material and Negative Electrode Active Material In this comparative example, for the paste for the positive electrode active material layer and the paste for the positive electrode current collector layer, raw materials were weighed in a way that Li/V of lithium vanadium phosphate was 2.60. In addition, for the paste for the negative electrode active material layer and the paste for the negative electrode current collector layer, raw materials were weighed in a way that Li/V of lithium vanadium phosphate was 1.48. For these materials, lithium vanadium phosphate powder was prepared by adopting the same method as in Example 22. Concerning the composition of lithium vanadium phosphate, Li/V was confirmed to be 2.60 and 1.48 by ICP. In addition, in terms of the amount of bivalent V contained in V, the amount of bivalent V in lithium vanadium phosphate was confirmed to be 85% and 1% by XPS.

Preparation of Paste for Positive Electrode Active Material Layer and Paste for Negative Electrode Active Material Layer Lithium vanadium phosphate powder with Li/V of 2.60 and lithium vanadium phosphate powder with Li/V of 1.48 were used for preparing the paste for the positive electrode active material layer and the paste for the negative electrode active material layer by adopting the same method as in Example 22.

Preparation of Paste for Solid Electrolyte Layer

For lithium aluminum titanium phosphate used as the solid electrolyte, it was weighed in a way of ensuring f=3.0, g=1.0, h=2.0, i=3.2, j=15.0 in the composition of $Li_fAl_gTi_h$-$P_iO_j$, $Li_2CO_3$, $Al_2O_3$, $TiO_2$ and $NH_4H_2PO_4$ were used as starting materials, ethanol was used as a solvent, and wet mixing was performed for 16 h by using a ball mill. After separating and drying the mixed powder of the starting materials from the balls and ethanol, calcination was performed for 2 h in a crucible made of alumina at 850° C. in the atmosphere. Thereafter, the calcined powder was treated for 16 h in ethanol by using the ball mill (120 rpm/zirconia balls) for the purpose of crushing. The crushed powder was separated from the balls and ethanol and dried to obtain the powder.

Preparation of Solid Electrolyte Sheet

The obtained lithium aluminum titanium phosphate powder was used for preparing the solid electrolyte sheet by adopting the same method as in Example 22.

Preparation of Paste for Positive Electrode Current Collector Layer and Paste for Negative Electrode Current Collector Layer Lithium vanadium phosphate powder with Li/V of 2.60, lithium vanadium phosphate powder with Li/V of 1.48 and Cu powder were used for preparing the paste for the positive electrode current collector layer and the paste for the negative electrode current collector layer by adopting the same method as in Example 22.

Preparation of Active Material Layer Unit and Preparation of Laminated Body

By adopting the same method as in Example 22, the paste for the positive electrode active material layer and the paste for the positive electrode current collector layer were used for preparing the positive electrode layer unit, and the paste for the negative electrode active material layer and the paste for the negative electrode current collector layer were used for preparing the negative electrode layer unit. Further, the sheet for the solid electrolyte layer, the positive electrode layer unit and the negative electrode layer unit were used for preparing the laminated body by adopting the same method as in Example 22.

Preparation of Sintered Body

After debindering the obtained laminated body, simultaneous sintering was performed to obtain the sintered body. The debindering was performed by heating to sintering temperature of 700° C. at speed of 50° C./h in nitrogen, and maintaining at this temperature for 10 hours. The simultaneous sintering was performed by heating to the sintering temperature of 850° C. at speed of 200° C./h in nitrogen, and maintaining at this temperature for 1 h, and then it was cooled naturally after sintering. The apparent size of the battery after simultaneous sintering was 3.2 mm*2.5 mm*0.4 mm.

Evaluation of Charge-Discharge Characteristics

Concerning the obtained laminated body, the charge-discharge capacity was determined by using a charge-discharge tester installed in a clamp fixed by using pins with springs. As determination conditions, determination was performed at charge and discharge current of 2 µA and voltage of 0V~1.8V. The determined discharge capacity was shown in Table 4. The threshold of the sufficient discharge characteristics in use was 2.5 µAh.

From Table 4, it can be seen that the all-solid-state battery which uses lithium aluminum titanium phosphate as the solid electrolyte can obtain significantly high discharge capacity under the situation that the lithium vanadium phosphate with Li/V and bivalent V in the range specified in the present invention is respectively used for the positive electrode active material layer and the negative electrode active layer.

TABLE 4

| | Positive electrode: Li/V | Positive electrode: proportion of bivalent V (%) | Negative electrode: Li/V | Negative electrode: proportion of bivalent V (%) | $Li_fAl_gTi_hP_iO_j$ | | | | | Discharge capacity of fabricated battery (µAh) |
|---|---|---|---|---|---|---|---|---|---|---|
| | | | | | f | g | h | i | J | |
| Example 22 | 2.30 | 78 | 1.80 | 33 | 1.02 | 0.13 | 1.91 | 3.00 | 12.03 | 5.16 |
| Example 23 | 2.30 | 78 | 1.80 | 33 | 1.50 | 0.50 | 1.50 | 3.00 | 12.00 | 3.95 |
| Example 24 | 2.30 | 78 | 1.80 | 33 | 2.00 | 1.00 | 1.00 | 3.00 | 12.00 | 2.65 |
| Example 25 | 2.30 | 78 | 1.80 | 33 | 2.10 | 1.10 | 0.90 | 3.00 | 12.00 | 2.54 |
| Example 26 | 2.30 | 78 | 1.80 | 33 | 0.50 | 0.02 | 1.00 | 2.80 | 9.28 | 3.10 |
| Example 27 | 2.30 | 78 | 1.80 | 33 | 0.50 | 0.02 | 2.00 | 3.20 | 12.28 | 3.36 |
| Example 28 | 2.30 | 78 | 1.80 | 33 | 0.50 | 1.00 | 1.00 | 2.80 | 10.75 | 2.89 |
| Example 29 | 2.30 | 78 | 1.80 | 33 | 0.50 | 1.00 | 2.00 | 3.20 | 13.75 | 2.61 |
| Example 30 | 2.30 | 78 | 1.80 | 33 | 3.00 | 0.10 | 1.00 | 2.80 | 10.65 | 2.93 |
| Example 31 | 2.30 | 78 | 1.80 | 33 | 3.00 | 0.10 | 2.00 | 3.20 | 13.65 | 2.61 |
| Example 32 | 2.30 | 78 | 1.80 | 33 | 3.00 | 1.00 | 1.00 | 2.80 | 12.80 | 2.80 |
| Example 33 | 2.30 | 78 | 1.80 | 33 | 3.00 | 1.00 | 2.00 | 3.20 | 15.00 | 2.64 |
| Comparative example 14 | 2.60 | 85 | 1.48 | 1 | 1.02 | 0.13 | 1.91 | 3.00 | 12.03 | 1.13 |
| Comparative example 15 | 2.60 | 85 | 1.48 | 1 | 1.50 | 0.50 | 1.50 | 3.00 | 12.00 | 0.86 |

TABLE 4-continued

| | Positive electrode: Li/V | Positive electrode: proportion of bivalent V (%) | Negative electrode: Li/V | Negative electrode: proportion of bivalent V (%) | $Li_fAl_gTi_hP_iO_j$ | | | | | Discharge capacity of fabricated battety (μAh) |
|---|---|---|---|---|---|---|---|---|---|---|
| | | | | | f | g | h | i | J | |
| Comparative example 16 | 2.60 | 85 | 1.48 | 1 | 2.00 | 1.00 | 1.00 | 3.00 | 12.00 | 0.41 |
| Comparative example 17 | 2.60 | 85 | 1.48 | 1 | 0.50 | 0.02 | 1.00 | 2.80 | 9.40 | 0.77 |
| Comparative example 18 | 2.60 | 85 | 1.48 | 1 | 0.50 | 1.00 | 2.00 | 3.20 | 13.75 | 0.65 |
| Comparative example 19 | 2.60 | 85 | 1.48 | 1 | 3.00 | 0.10 | 1.00 | 2.80 | 10.65 | 0.73 |
| Comparative example 20 | 2.60 | 85 | 1.48 | 1 | 3.00 | 1.00 | 2.00 | 3.20 | 15.00 | 0.66 |

INDUSTRIAL APPLICABILITY

As described above, the all-solid-state battery provided by the present invention has an effect on improving the discharge capacity.

The all-solid-state battery capable of providing high capacity makes a very great contribution to the field of electronics.

DESCRIPTION OF REFERENCE NUMERALS

1 All-solid-state battery
2 Positive electrode layer
3 Negative electrode layer
4 Solid electrolyte layer
5 Packaging layer
6 Positive electrode current collector layer
7 Positive electrode active material layer
8 Negative electrode active material layer
9 Negative electrode current collector layer

What is claimed is:

1. An all-solid-state battery, wherein,
the all-solid-state battery is provided with a solid electrolyte layer between a pair of electrode layers,
a positive electrode active material layer and a negative electrode active material layer forming the pair of electrode layers contain lithium vanadium phosphate,
the lithium vanadium phosphate contains a polyphosphate compound containing Li and V, and satisfies 1.50<Li/V≤2.30, and the proportion of bivalent V contained in V is 5%~80%.

2. The all-solid-state battery according to claim 1, wherein,
the solid electrolyte layer contains lithium aluminum titanium phosphate.

3. The all-solid-state battery according to claim 1, wherein,
the value of Li/V of the lithium vanadium phosphate contained in the positive electrode active material layer is greater than the value of Li/V of the lithium vanadium phosphate contained in the negative electrode active material layer.

4. The all-solid-state battery according to claim 1, wherein,
the lithium vanadium phosphate contained in the positive electrode active material layer satisfies 1.60≤Li/V≤2.30 and the proportion of bivalent V in V is 10%~80%; and the lithium vanadium phosphate contained in the negative electrode active material layer satisfies 1.50<Li/V≤2.10, and the proportion of bivalent V in V is 5%~57%.

5. The all-solid-state battery according to claim 1, wherein,
the solid electrolyte contains $Li_fAl_gTi_hP_iO_j$, wherein, f, g, h, i and j respectively satisfy 0.5≤f≤3.0; 0.0<g≤1.0; 1.0≤h≤2.0; 2.8≤i≤3.2; and 9.25<j≤15.0.

6. The all-solid-state battery according to claim 1, wherein,
the relative density of the pair of electrode layers and the solid electrolyte layer arranged between the pair of electrode layers is 80% or above.

* * * * *